US008978951B2

(12) United States Patent
Wei

(10) Patent No.: US 8,978,951 B2
(45) Date of Patent: Mar. 17, 2015

(54) AUTO HAMMER

(75) Inventor: Gan Wei, Nanjing (CN)

(73) Assignee: Chervon (HK) Limited, Hong Kong (HK)

( * ) Notice: Subject to any disclaimer, the term of this patent is extended or adjusted under 35 U.S.C. 154(b) by 545 days.

(21) Appl. No.: 13/420,035

(22) Filed: Mar. 14, 2012

(65) Prior Publication Data

US 2012/0247797 A1 Oct. 4, 2012

(30) Foreign Application Priority Data

Mar. 29, 2011 (CN) ...................... 2011 2 0093131 U

(51) Int. Cl.

| | |
|---|---|
| ***B25C 7/00*** | (2006.01) |
| ***B23B 45/16*** | (2006.01) |
| ***B25D 9/00*** | (2006.01) |
| ***B25D 11/00*** | (2006.01) |
| ***B25D 13/00*** | (2006.01) |
| ***B25D 16/00*** | (2006.01) |
| ***E21B 1/00*** | (2006.01) |
| ***B25D 11/06*** | (2006.01) |

(52) U.S. Cl.

CPC .................................... *B25D 11/068* (2013.01)
USPC ........................................... 227/117; 227/147

(58) Field of Classification Search

USPC ........ 227/63, 107, 131, 147; 173/46, 48, 213, 173/39, 91, 117
See application file for complete search history.

(56) References Cited

U.S. PATENT DOCUMENTS

| | | | | |
|---|---|---|---|---|
| 3,858,430 | A * | 1/1975 | Kushnarenko et al. | 72/430 |
| 4,014,392 | A * | 3/1977 | Ross | 173/118 |
| 4,720,051 | A * | 1/1988 | Graveman et al. | 241/186.3 |
| 7,059,425 | B2 * | 6/2006 | Ikuta | 173/128 |
| 7,204,322 | B2 * | 4/2007 | Sakai | 173/162.1 |
| 7,789,282 | B2 * | 9/2010 | Fukinuki et al. | 227/131 |
| 7,963,430 | B2 * | 6/2011 | Fukinuki et al. | 227/131 |
| 8,256,527 | B2 * | 9/2012 | Wu | 173/122 |
| 8,308,039 | B2 * | 11/2012 | Wei | 227/147 |
| 8,348,120 | B2 * | 1/2013 | Wei | 227/147 |
| 8,424,734 | B2 * | 4/2013 | Zhou | 227/147 |
| 8,469,250 | B2 * | 6/2013 | Zhou | 227/147 |
| 8,479,965 | B2 * | 7/2013 | Chen | 227/119 |
| 8,485,276 | B2 * | 7/2013 | Wei | 173/217 |
| 8,596,512 | B2 * | 12/2013 | Zhou et al. | 227/147 |
| 8,672,051 | B2 * | 3/2014 | Sakai | 173/117 |
| 8,678,262 | B2 * | 3/2014 | Zhou et al. | 227/144 |
| 8,783,378 | B2 * | 7/2014 | Zhou | 173/91 |
| D714,609 | S * | 10/2014 | Beukema | D8/61 |
| 2008/0054043 | A1 * | 3/2008 | Beales | 227/129 |

* cited by examiner

*Primary Examiner* — Robert Long
(74) *Attorney, Agent, or Firm* — Greenberg Traurig, LLP

(57) ABSTRACT

An auto hammer includes a motor arranged in a housing, a striking device arranged in a nozzle portion of the housing and a transmission mechanism for converting the rotating motion of the motor into the striking motion for the striking device. The transmission mechanism includes a striking assembly for exerting a striking motion to the striking device, the striking assembly includes a rotational driving member and a rotational striking member enclosing the rotational driving member, and the rotational striking member is provided with at least one striking portion for striking and contacting the striking device. The auto hammer has a gripping portion suitable for palm gripping which is arranged on a back side of the housing opposite to the striking device where the motor is arranged on the same side as the striking assembly relative to the axis of the reciprocating linear motion of a striking shaft of the striking device.

14 Claims, 7 Drawing Sheets

AUTO HAMMER

RELATED APPLICATION INFORMATION

This application claims the benefit of CN 201120093131.0, filed on Mar. 29, 2011, the disclosure of which is incorporated herein by reference in its entirety.

BACKGROUND

The present disclosure relates to a power tool and, more particularly, to an auto hammer for striking a fastener such as a nail.

An auto hammer is a commonly used hand-held tool, which has various types. According to the power source, the auto hammer can be divided into two types: pneumatic and electric. The pneumatic auto hammer must be equipped with an air compressor as a power supply, thus the use of the pneumatic auto hammer is limited in some occasions. The electric auto hammer comprises a transmission mechanism for converting the rotating motion of a motor into the linear motion of an impact rod arranged in a nozzle. When a switch on the auto hammer is turned on, the electric power energy is converted into the mechanical energy of the reciprocating motion.

Both U.S. Pat. No. 6,431,430 and PCT Publication No. WO 2006/008546 disclose an electric auto hammer powered by a battery pack. The described electric auto hammer comprises a slider-crank mechanism for converting the rotating motion into the linear motion. However, one disadvantage of the described auto hammer is that the slider-crank mechanism substantially performs the push actions, but not the strike actions. The efficiency of such push actions is much lower than that of the strike actions when the auto hammer is provided with the same motor power. Another disadvantage is that the stroke of a pushing rod driven by the slider-crank mechanism is a constant, so when the nail meets a hard object, the resistance force produced thereby may cause the rotor of the motor to be locked. A further disadvantage is that the motor is arranged in front of or behind the handle so that the connection between the motor and the transmission mechanism takes a lot of space which make the auto hammer relatively larger and inconvenient for a user to operate and carry.

Chinese Patent No. 1769010 discloses an auto hammer which comprises a rack and pinion mechanism for converting the rotating motion of a motor into the biasing force of a compression spring, and then the compression spring is released by a releasing mechanism to produce a striking force. The described auto hammer can carry out a single-strike action under the spring force, but not a continuous strike action. So the work efficiency is still relatively low, and the auto hammer cannot be used frequently. Furthermore, the motor is arranged in a housing below a head and separated from a handle, thus the structure of the auto hammer is still not compact.

SUMMARY

To overcome the limitations and disadvantages noted above, the following describes an auto hammer which has a compact structure, a small size, and one which can be easily gripped. More particularly, the following describes an auto hammer having a motor arranged in a housing, a striking device arranged in a nozzle portion of the housing and a transmission mechanism for converting the rotating motion of the motor into the striking motion for the striking device, wherein the transmission mechanism includes a striking assembly for exerting a striking motion onto the striking device, and the striking assembly further includes a rotational driving member and a rotational striking member enclosing the rotational driving member, and the rotational striking member is provided with at least one striking portion for striking and contacting the striking device. The auto hammer also has a gripping portion suitable for palm-gripping that is arranged on the back side of the housing opposite to the striking device, and the motor is arranged on the same side as the striking assembly relative to the axis of the reciprocating linear motion of a striking shaft of the striking device.

Further, the auto hammer also includes a battery pack for supplying power to the motor, and the battery pack and the motor are arranged on the same side of the striking device.

Further, the battery pack is arranged parallel to the motor.

Alternatively, the auto hammer further includes a battery pack for supplying power to the motor, and the battery and the motor are arranged on the two opposite sides of the striking device respectively.

Further, the battery pack is arranged substantially parallel to the striking device.

By adjusting the relative position between the battery pack, the motor and the striking device, for example, as compared with such an arrangement in which the battery pack is provided coaxially behind the motor and where the device has a long gripping handle, the subject auto hammer significantly reduces the length of the whole auto hammer by arranging the battery pack parallel to the motor, so that the subject auto hammer is small and portable. In addition, the gripping portion is arranged on the back side of the housing opposite to the striking device, so that it can be gripped more comfortably; meanwhile, the striking assembly and the motor are arranged on the same side of the striking device, which is helpful for striking the nails at a corner position of the work piece.

As will become apparent, the auto hammer described hereinafter includes one or more of the following:

The rotational driving member is provided with an actuating portion for driving the rotational striking member to rotate, and the rotational striking member is provided with a linkage portion which can mate with the actuating portion and move in the direction of the rotating axis of the striking assembly relative to the actuating portion.

The actuating portion is configured as a groove or a projection, and the linkage portion is configured as a projection or a groove which can correspondingly mate with the groove or the projection of the actuating portion.

The rotational driving member and the rotational striking member are respectively formed with corresponding grooves with an engaging member mounted therein.

The rotational driving member is provided with a pair of slant grooves, and the rotational striking member is provided with a pair of guide grooves corresponding to the pair of slant grooves.

The rotational striking member has a hollow portion and encloses the rotational driving member via the hollow portion.

The rotational striking member is provided with a protruding shaft portion which is enclosed into the hollow portion of the rotational driving member.

The transmission mechanism also includes a transmitting portion for vertical turning.

An output gear of the transmitting portion is connected fixedly with or integrally made with the rotational driving member.

With the above arrangements, the subject auto hammer has a compact structure, small size, comfortable gripping and good portability while allowing the device to be used to strike fasteners, such as nails, etc., periodically and continuously.

DETAILED DESCRIPTION

The present invention will now be explained in details with reference to the drawings.

Figure 1:
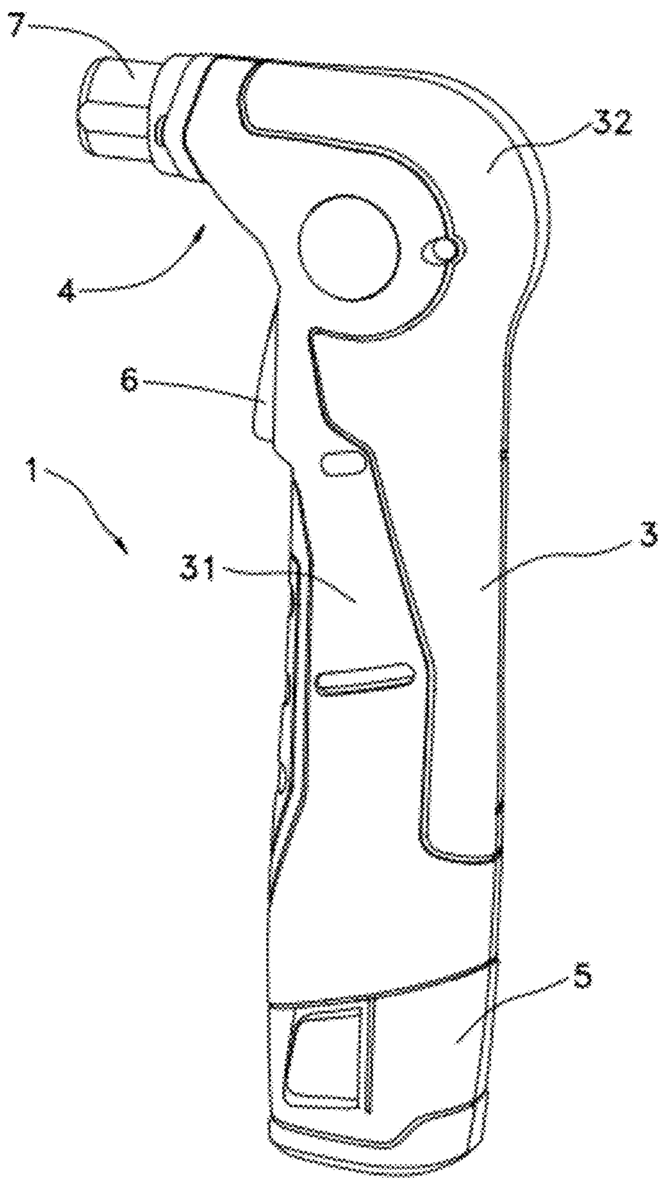
FIG. 1 is a perspective view of an exemplary auto hammer constructed according to the description that follows.

As shown in FIG. 1, an auto hammer 1 includes a housing 3 which consists of two half-housings. The housing 3 has a body portion which forms a gripping handle 31 in the longitudinal direction. A switch 6 is mounted on the gripping handle 31 for turning on/off a motor arranged in the housing 3. A battery pack 5 is mounted on the lower end of the housing 3. A nozzle portion 4 is provided on a head portion 32 on the upper end of the housing 3 for receiving a striking device 7 for striking a fastener such as a nail.

In the present embodiment, the battery pack 5 is substantially coaxial with the gripping handle 31. The casing of the battery pack 5 is adjacently smooth to, e.g., aligned with, the housing 3. At least a portion of the battery pack 5 is inserted into the housing 3, so that the connection between the battery pack 5 and the housing 3 is more stable. In other embodiments, the battery pack 5 can be arranged parallel or perpendicular to a longitudinal axis of the gripping handle 31. The auto hammer 1 is not limited to be supplied by the battery pack, and an AC power supply is feasible.

Figure 2:
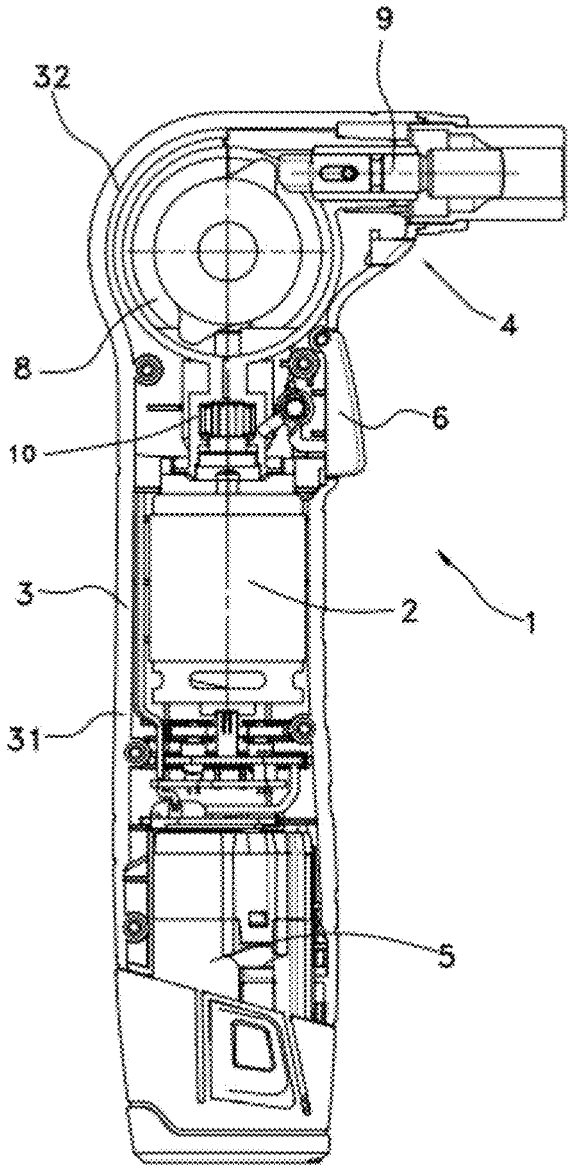
FIG. 2 is a view illustrating the inner structure of the auto hammer in FIG. 1 with half of the housing removed.
Figure 3:
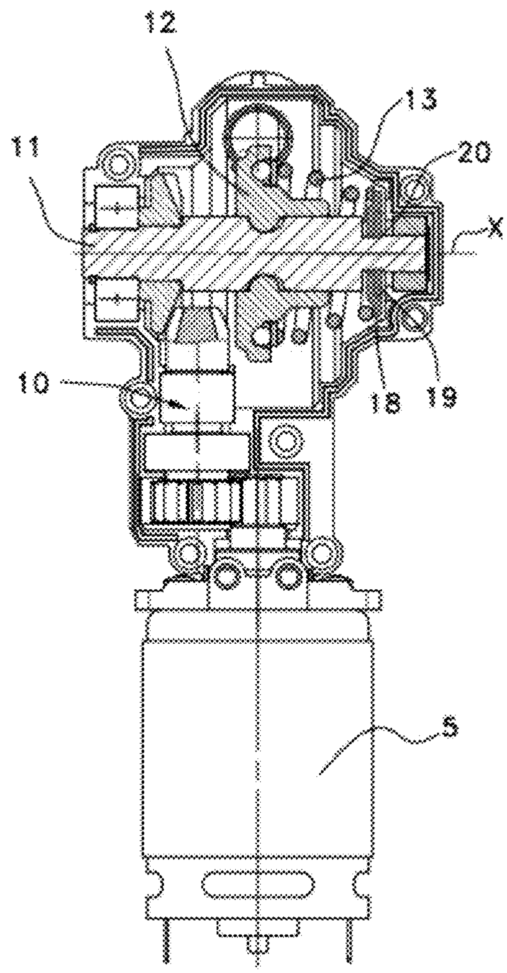
FIG. 3 is a sectional view of the auto hammer in FIG. 2 along a plane perpendicular to the view of FIG. 2.
Figure 4:
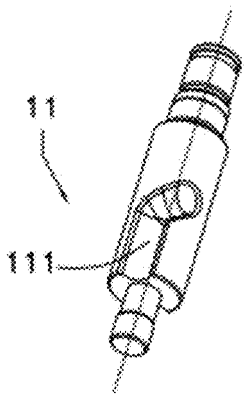
FIG. 4 is a perspective view of a rotating shaft shown in FIG. 3.
Figure 5:
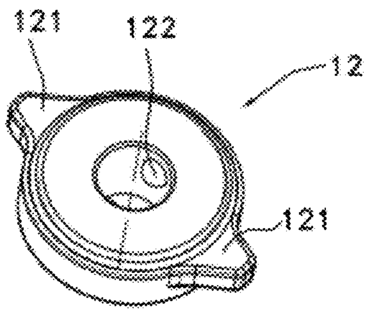
FIG. 5 is a perspective view of a striking wheel shown in FIG. 3.
Figure 6:
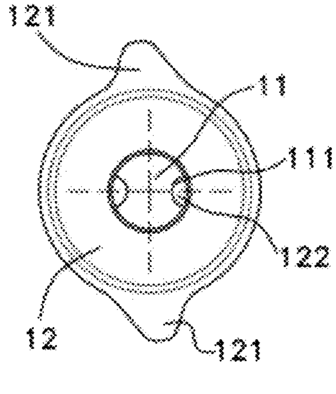
FIG. 6 is a view of the rotating shaft and the striking wheel shown in FIG. 3 as assembled together.
Figure 7:
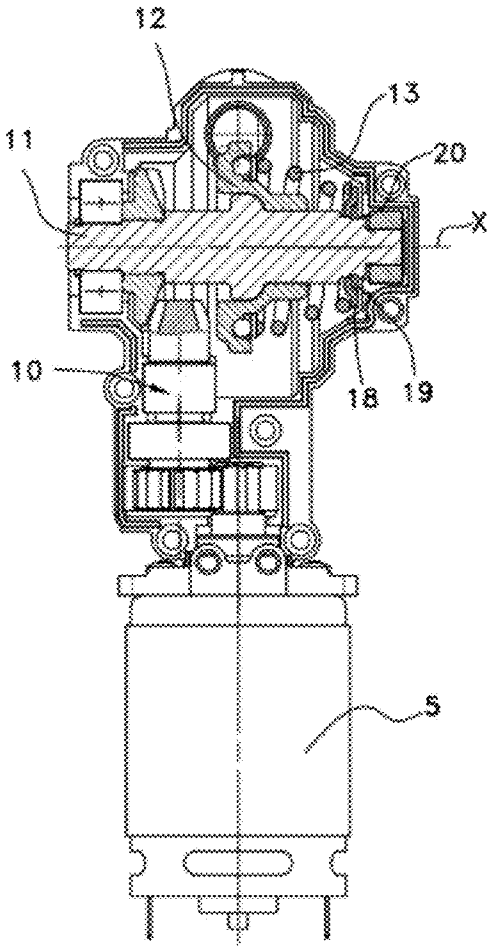
FIG. 7 is a sectional view of the auto hammer in FIG. 2 along a plane perpendicular to the view of FIG. 2 showing a further embodiment.
Figure 8:
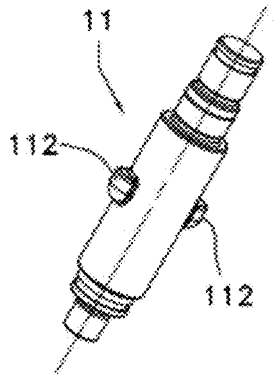
FIG. 8 is a perspective view of a rotating shaft as shown in FIG. 7.
Figure 9:
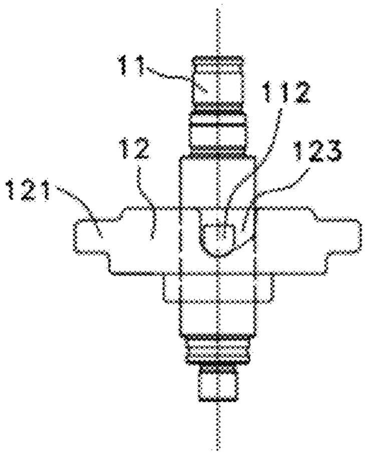
FIG. 9 is a view of the rotating shaft and a striking wheel as shown in FIG. 7 as assembled together and in a first position.
Figure 10:
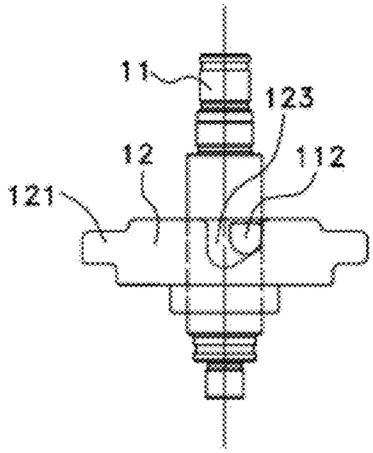
FIG. 10 is a view of the rotating shaft and a striking wheel as shown in FIG. 7 as assembled together and in a second position.

FIG. 2 shows a view of the inner structure of the auto hammer 1. A motor 2 is arranged in the housing 3. The rotating motion of the motor 2 is converted into the impact motion for the striking device 7 by a transmission mechanism 10. The transmission mechanism 10 includes a gear transmission portion 10 which rotates and an impact assembly 8 for impacting the striking device 7. The striking device 7 includes a striking shaft 9 which performs linear reciprocating motions. Referring to FIG. 3-7, the impacting assembly 8 includes a rotating shaft 11 and a striking wheel 12 which have the same rotating axis X. The rotating shaft 11 is supported in the head portion 32 of the housing 3 via the bearings on the two ends. The rotating shaft 11 is driven to rotate by a pair of bevel gears 101 and 102. In the present embodiment, the rotating shaft 11 is connected fixedly to the big bevel gear 102. In other embodiments, referring to FIGS. 11 and 12, the rotating shaft 11 can be integrated with the big bevel gear 102. The striking wheel 12 has a plate shape and encloses the rotating shaft 11 via a hollow portion. The striking wheel 12 is provided with at least one striking portion 121, preferably two striking portions 121 which are arranged symmetrically relative to the rotating axis X and protruded outwards from the outer circumference of the striking wheel 12. During the rotation of the striking wheel 12 driven by the rotating shaft 11, the striking portion 121 of the striking wheel 12 strikes a struck portion of the striking shaft 9 continuously and periodically. Thereby the front end of the striking shaft 9 strikes a fastener such as a nail continuously and periodically, and the nail is struck gradually into a work piece to be processed.

FIG. 3-6 show views in which the rotating shaft 11 of the auto hammer drives the striking wheel 12 to rotate, and the periodic striking actions thus can be achieved. The striking wheel 12 encircles the rotating shaft 11. The rotating shaft 11 is provided with a pair of slant grooves 111 at the engaging position with the striking wheel 12 which are oblique relative to the rotating axis X. Preferably, to facilitate assembling, one end of the slant groove 111 extends to one end surface of the rotating shaft 11. Correspondingly, a pair of projections 122 is provided at the engaging position of the striking wheel 12 which can be engaged with the slant grooves 111 respectively. When the switch 6 is turned on initially, the projections 122 are positioned at the bottom of the slant grooves 111, and the striking wheel 12 is driven to rotate by the rotating shaft 11. While one of the striking portions 121 of the striking wheel 12 strikes the striking shaft 9, the striking portion 121 is stopped by the striking shaft 9, so that the rotation of the striking wheel 12 is blocked temporarily. However, the rotating shaft 11 still continues rotating, which forces the projections 122 to move in the slant grooves 111. Thus the striking wheel 12 is driven to move axially towards an energy storage spring 13 and compress the spring 13 till the striking portion 121 of the striking wheel 12 staggering from the striking shaft 9. Once the blocking of the striking wheel 12 by the striking shaft 9 is eliminated, the striking wheel 12 rotates at a speed in excess of the rotation speed of the rotating shaft 11 under the biasing force of the energy storage spring 13, and the projections 122 are forced to move along the direction of the pushing force of the energy storage spring 13 in the slant grooves 111, so that the position of the striking wheel 12 corresponds to the position of the striking shaft 9 again. When the other striking portion 121 strikes the struck portion of the striking shaft 9, another striking action is accomplished. The above process will be repeated to strike the nail into the work piece.

In the present embodiment, the energy storage spring 13 is arranged in the housing 3, and exerts a pushing force to the striking wheel 12 along the direction of the axis X. One end of the energy storage spring 13 abuts against one side of the striking wheel 12 directly or indirectly, and the other end abuts against a gasket 18 enclosing the rotating shaft 11. The gasket 18 is positioned in the axis direction of the rotating shaft 11 by a retainer ring 19 embedded in an annular groove 20 of the rotating shaft 11. In other embodiments, the retainer ring 19 can be replaced by an annular flange or shaft shoulder (not shown in the drawings) which is directly formed on the rotating shaft 11 and can serve as a stopper.

FIGS. 7-10 show another embodiment in which the rotating shaft 11 of the auto hammer drives the striking wheel 12 to rotate, and the periodic striking actions thus can be achieved. The operational principle of this embodiment is the same as the embodiment described above and, as such, need not be described in greater details herein. The difference only lies in that at the place where the rotating shaft 11 encircles the striking wheel 12, the slant grooves and the projections mated with each other in the above embodiment are replaced with each other, that is, the slant grooves 123 are arranged in the striking wheel, while the projections 112 are arranged on the rotating shaft.

In the above two embodiments, the striking wheel 12 is formed with a hollow portion to encircle the rotating shaft 11. However, the connecting form of the striking wheel 12 and the rotating shaft 11 of the present invention is not limited to the above two embodiments. For example, the striking wheel 12 is formed with a protruding shaft which is enclosed into a hollow portion of the rotating shaft. Correspondingly, the grooves and the projections mated with each other at the enclosing position are respectively arranged on the outer cylindrical surface of the protruding shaft and the inner cylindrical surface of the hollow portion of the rotating shaft, which can also achieve the object of the present invention.

Figure 11:
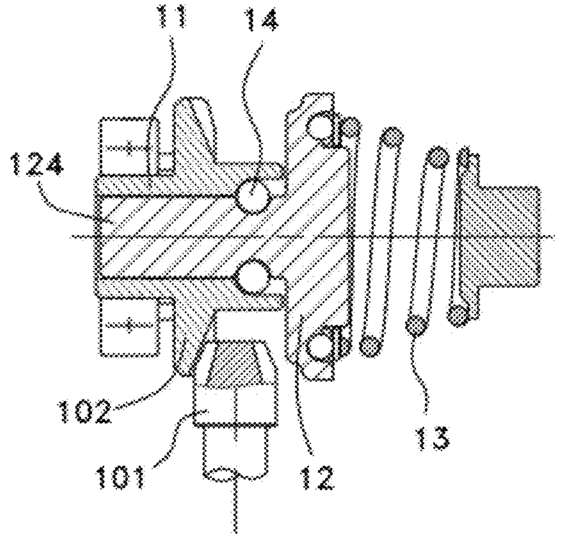
FIG. 11 is a view of the auto hammer in FIG. 2 along a plane perpendicular to the view of FIG. 2 showing a still further embodiment wherein a housing, a motor and a part of a transmission mechanism are removed.
Figure 12:
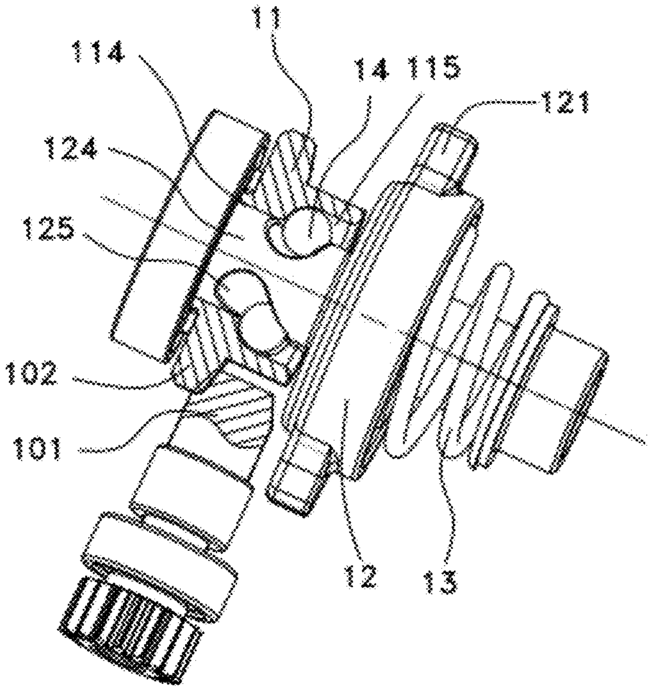
FIG. 12 is a perspective view of the device shown in FIG. 11 partially sectioned.

FIGS. 11 and 12 show views of further another embodiment, in which the rotating shaft 11 of the auto hammer drives the striking wheel 12 to rotate, and the periodic striking actions thus can be achieved. The striking wheel 12 is provided with a protruding shaft portion 124 which is enclosed into a hollow portion 114 of the rotating shaft 11. At the enclosing position, an inner cylindrical surface of the rotating shaft 11 and an outer cylindrical surface of the protruding shaft 124 are respectively formed with a pair of slant grooves 115 arranged oblique relative to the axis X and a pair of guide grooves 125. The position of each guide groove 125 corresponds to that of each slant groove 115. A pair of steel balls 14 is respectively arranged in a cavity formed by the slant groove 115 and guide groove 125, and move with the change of the position of the cavity caused by the change of the relative position of the slant groove 115 and the guide grooves 125. Then, when the rotating shaft 11 rotates, the striking wheel 12 can be driven to rotate as a result of the steel balls 14 arranged in the slant grooves 115 exerting a pressure to the guide grooves 125. The energy storage spring 13 is mounted in the housing 3, one end of which is fixed and the other end of which abuts against one side of the striking wheel 12. The energy storage spring 13 exerts a pushing force to the striking wheel 12 in the axis direction of the striking wheel 12, so that when the rotating shaft 11 and the striking wheel 12 are immobile or rotate without load, the steel balls 14 are located at the top of the slant grooves 115 and the bottom of the guide grooves 125, and the striking wheel 12 is located in a first axial position relative to the rotating shaft 11. When the motor is started, the striking wheel 12 rotates together with the rotating shaft 11 until the striking portion 121 of the striking wheel 12 strikes the striking shaft 9 to achieve a striking action to the striking shaft 9. Meanwhile, because the end of the striking shaft 9 in contact with the striking wheel 12 would temporarily stop the further rotation of the striking wheel 12, the striking wheel 12 is forced to move axially towards a second position compressing the energy storage spring 13 relative to the rotating shaft 11 under the interaction of the grooves 115, 125 and the engaging element (for example, the steel balls 14) therein. When the striking wheel 12 moves to stagger from the striking shaft 9 and disengages from blocking, it will rotate at a speed in excess of the normal rotation speed of the rotating shaft 11 under the action of the elastic potential energy released by the energy storage spring 13, and move to the first position again, which causes the striking wheel 12 to strike the striking shaft 9 powerfully by its rotation potential energy again.

Figure 13:
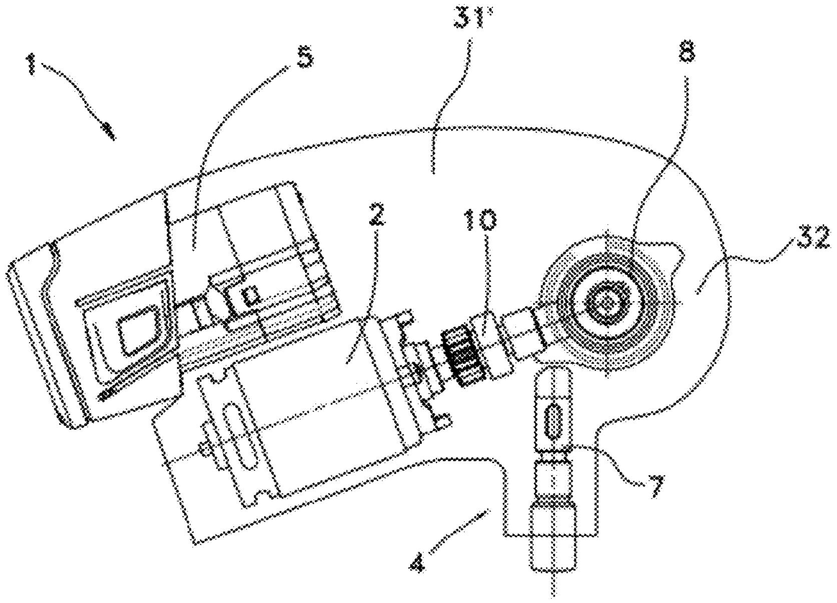
FIG. 13 is a perspective view of the auto hammer wherein the battery pack, the motor, the transmission mechanism and the striking device are arranged in a first position.
Figure 14:
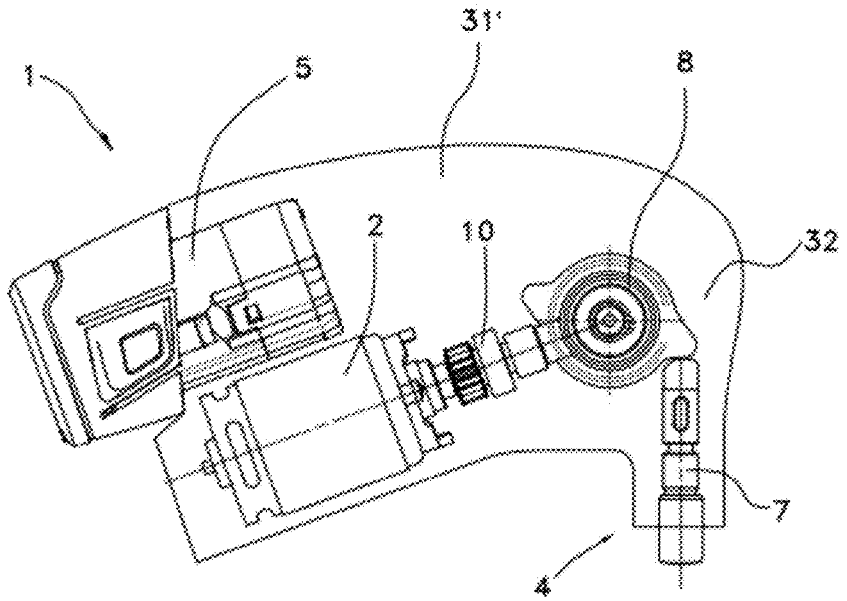
FIG. 14 is a perspective view of the auto hammer wherein the battery pack, the motor, the transmission mechanism and the striking device are arranged in a second position.
Figure 15:
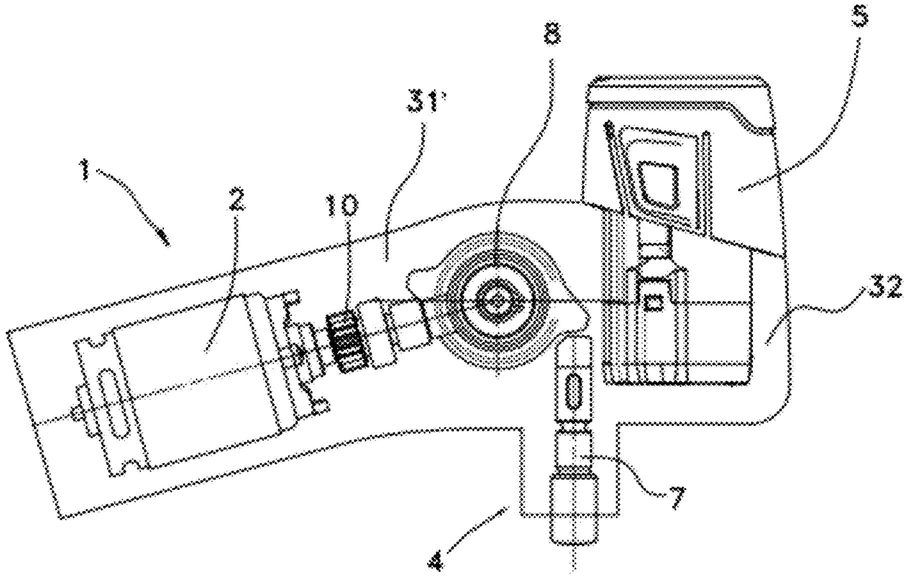
FIG. 15 is a perspective view of the auto hammer wherein the battery pack, the motor, the transmission mechanism and the striking device are arranged in third position.

FIGS. 13-15 are views showing an appearance of the auto hammer of the present invention with a palm-shaped gripping portion and the inner structure of the auto hammer. The battery pack 5 and the motor 2 are arranged parallel to each other, so that the dimension of the auto hammer 1 in the longitudinal direction is reduced significantly while the dimension in the radial direction is broadened. Thus, the gripping portion is shifted from the long gripping handle 31 to the back gripping portion 31' of the housing 3 opposite to the striking device 7, and the gripping manner is changed from gripping with the palm surrounding the gripping handle 31 to palm-gripping with a majority of the palm flat-pressing on the back gripping portion 31', thereby providing for more comfortable gripping. Further, the striking assembly 8 and the motor 2 are respectively arranged on two sides of an axis defined by the linear reciprocating motion of the striking shaft 9 of the striking device 7, so that the centre of the gripping portion 31' is closer to or passes through the axis of the reciprocating linear motion of the striking shaft 9 of the striking device 7, which reduces the striking moment of the gripping portion 31' and provides for more comfortable gripping which minimizes fatigue of an operator and which is therefore more suitable for longer operational times. Meanwhile, the arrangement results in a device that is more compact and more portable. When the auto hammer is gripped in the palm, the auto hammer 1 may be further provided with a band (not shown in the drawings) for tightly binding the hand of an operator to the back gripping portion 31', which efficiently reduces the operating force on the wrist of the operator and the working intensity of the operation.

The battery pack 5 and the motor 2 of the present invention may also be arranged on opposite sides of the striking device 7 respectively, to enhance balance of the whole machine with respect to the working position where the striking shaft 9 of the striking device 7 strike the nail in a linear reciprocating motion. At this time, in order to enable the auto hammer 1 to have a smaller shape and be suited for gripping, the battery pack 5 can be arranged at an angle relative to the mounting axis of the motor 2. Preferably, the battery pack 5 and the striking device 7 are arranged parallel to each other.

The motor 2 and the striking assembly 8 of the present invention may also be arranged on the same side of the striking device 7 so that the striking device 7 is closer to the head portion 32 of the housing 3, thus it is more helpful for striking nails which are closer to the corners of a work piece.

The auto hammer of the present invention is not limited to the contents described in the above embodiments and the structure represented in the drawings. For example, one of the rotating shaft 11 and the striking wheel 12 can also rotate by enclosing a stationary shaft which is supported in the housing (not shown) by the bearings on the two ends of the stationary shaft. Anyway, the obvious changes, replacements and modifications to the shape and position of the components based on the present utility model are contained within the protection scope of the present utility model.

What is claimed is:

1. An auto hammer, comprising:

a housing having a nozzle portion;

a motor received in the housing;

a striking device arranged in the nozzle portion of the housing; and a transmission mechanism for converting a rotating motion of the motor into a striking motion for the striking device;

wherein the transmission mechanism includes a striking assembly for exerting the striking motion to the striking device, and the striking assembly includes a rotational driving member and a rotational striking member encircling the rotational driving member, and the rotational striking member is provided with at least one striking portion for striking and contacting the striking device and wherein the housing provides a gripping portion suitable for palm-gripping and arranged on the back side of the housing opposite to the striking device, and the motor is arranged on the same side as the striking assembly relative to an axis of the striking motion of the striking device.

2. The auto hammer according to claim 1, comprising a battery pack for supplying power to the motor wherein the battery pack and the motor are arranged on the same side of the striking device.

3. The auto hammer according to claim 2, wherein the battery pack is arranged parallel to the motor.

4. The auto hammer according to claim 1, comprising a battery pack for supplying power to the motor wherein the battery pack and the motor are arranged on opposite sides of the striking device.

5. The auto hammer according to claim 4, wherein the battery pack is arranged substantially parallel to the striking device.

6. The auto hammer according to claim 1, wherein the rotational driving member is provided with an actuating portion for driving the rotational striking member to rotate, and the rotational striking member is provided with a linkage portion which can mate with the actuating portion and move in the direction of the rotating axis of the striking assembly relative to the actuating portion.

7. The auto hammer according to claim 6, wherein the actuating portion includes one of a groove and a projection and the linkage portion includes the other of the projection and the groove which mates with the one of the groove and the projection of the actuating portion.

8. The auto hammer according to claim 1, wherein the rotational driving member and the rotational striking member are respectively formed with corresponding grooves with an engaging member mounted therein.

9. The auto hammer according to claim 8, wherein the rotational driving member is provided with a pair of slant grooves and the rotational striking member is provided with a pair of guide grooves corresponding to the pair of slant grooves.

10. The auto hammer according to claim 7, wherein the rotational striking member has a hollow portion and encircles the rotational driving member via the hollow portion.

11. The auto hammer according to claim 7, wherein the rotational striking member is provided with a protruding shaft portion which is encircled by a hollow portion of the rotational driving member.

12. The auto hammer according to claim 1, wherein the transmission mechanism further includes a transmitting portion that turns vertically.

13. The auto hammer according to claim 12, comprising an output gear fixedly connected with the rotational driving member.

14. The auto hammer according to claim 12, comprising an output gear fixedly integrally formed with the rotational driving member.

* * * * *